J. GRIFFITH & F. C. DURANT.
Filters.

No. 154,670. Patented Sept. 1, 1874.

Witnesses.
Henry Gentner
Chas Wahlers

Inventors.
John Griffith
Frederick C. Durant
p.
Van Santvoord & Hauff
att'ys

UNITED STATES PATENT OFFICE.

JOHN GRIFFITH, OF YONKERS, AND FREDERICK C. DURANT, OF NEW YORK, N. Y.

IMPROVEMENT IN FILTERS.

Specification forming part of Letters Patent No. 154,670, dated September 1, 1874; application filed July 3, 1874.

*To all whom it may concern:*

Be it known that we, JOHN GRIFFITH, of Yonkers, in the county of Westchester and State of New York, and FREDERICK C. DURANT, of the city, county, and State of New York, have invented a new and useful Improvement in Filters; and we do hereby declare the following to be a full, clear, and exact description thereof, which will enable those skilled in the art to make and use the same, reference being had to the accompanying drawing forming part of this specification, in which drawing—

Figure 1:
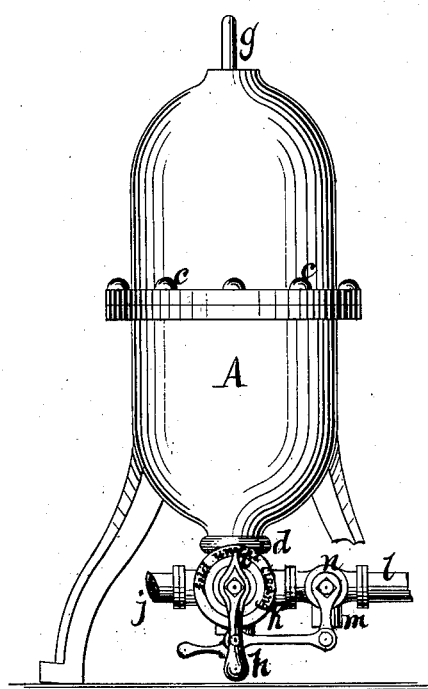
Figure 2:
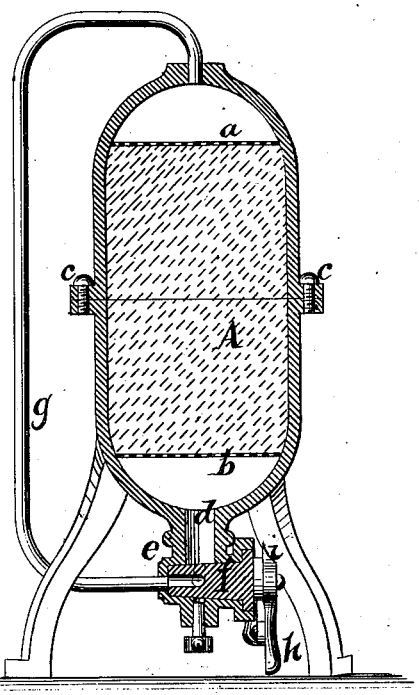
Figure 4:
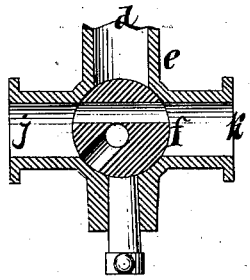
Figure 5:
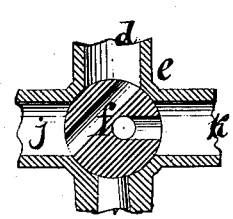
Figure 6:
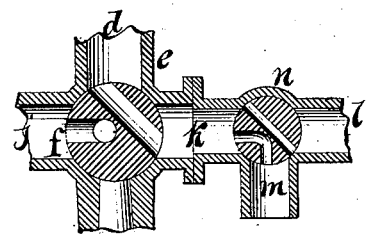

Figure 1 represents a front view of this invention. Fig. 2 is a transverse section of the same in the plane $x\, x$, Fig. 1. Figs. 4, 5, and 6 show the course of the liquid for the different positions of the stop-cocks.

Similar letters indicate corresponding parts.

This invention consists in the combination of two cocks with a liquid-supply pipe, with pipes leading to and from a vessel containing the filtering material, with a waste-pipe, and with a discharge-pipe, one of said cocks being a three-way cock, and the other a two-way cock, in such a manner that by adjusting these cocks the liquid can be made to pass from the supply-pipe directly to the discharge-pipe, or that, when the filtering material is charged with impurities, these impurities can be washed out by passing the liquid through the filtering material to the waste-pipe, and by these means a filter is obtained which can be used for a long time without requiring a fresh charge of filtering material.

In the drawing, the letter A designates a vessel made of cast-iron or any other suitable material, and provided with a sieve, $a$, near its top, and with another sieve, $b$, near its bottom. The space between these two sieves is filled with bone-black, or other suitable filtering material, according to the nature of the liquid to be filtered. Said vessel is, by preference, constructed in two halves, each half being provided with a flange, so the same can be firmly united by means of screws $c$, as shown. From the bottom of the vessel A extends a pipe, $d$, which connects with the shell $e$ of a stop-cock, $f$. This shell is closed at both ends, and from one end extends a pipe, $g$, which passes into the top of the vessel A. The stem of the plug or valve $f$ projects through the opposite end of said shell, and bears a lever, $h$, and an index, $i$. From the sides of the shell $e$ extend pipes $j\, k$ in opposite directions; the pipe $j$ being connected to the liquid-supply pipe, while the pipe $k$ leads to the discharge-pipe $l$ and to the waste-pipe $m$. The communication between the pipes $k$, $l$, and $m$ is controlled by a stop-cock, $n$, which is so constructed that by turning it in the proper positions the pipe $k$ can be made to communicate either with the discharge-pipe $l$ or with the waste-pipe $m$. The stop-cock $f$ is of such a form that by turning it in one position a direct communication is made between the pipes $j$ and $k$; by turning it in a second position, communication is made between the supply-pipe $j$ and the upright pipe $d$, and also between the tail-pipe $g$ and the pipe $k$; and by turning said cock in a third position, communication is made between the supply-pipe $j$ and tail-pipe $g$, and also between the upright pipe $d$ and the pipe $k$. The two cocks $f$ and $n$ are connected together by a rod, $o$, and levers $h\, p$, (see Fig. 1,) so that when the cock $f$ is turned in the first position above named, the pipe $k$ communicates directly with the discharge-pipe $l$, and when the cock $f$ is turned in the second position, the pipe $k$ still communicates with the discharge-pipe $l$; but when the cock $f$ is turned to its third position, the pipe $k$ is brought in communication with the waste-pipe $m$.

The three positions of the stop-cock are marked on the face of the shell $e$ by the words "unfiltered," "filtered," and "cleansing," and as the cock is turned the index $i$ points to either of these words, and thereby shows which position the stop-cock occupies. When the stop-cock $f$ is turned in its first position, the index $i$ pointing to the word "unfiltered," the liquid passes from the supply-pipe $j$ directly through the pipe $k$ to the discharge-pipe $l$ without entering the filtering-vessel. (See Fig. 4.) When this stop-cock occupies its second position, (the index $i$ pointing to the word "filtered,")'the liquid which enters through the supply-pipe $j$ passes up through the upright pipe $d$ into the filtering-vessel A, through the filtering material contained therein to the tail-pipe $g$, from this pipe through the stop-cock $f$ and pipe $k$ to the discharge-pipe $l$, so that the impurities contained in the liquid will be retained in the filtering material. (See Fig. 5.) When the filtering material has become saturated with impurities, the cock $f$ is turned to its third position, the index $i$ being made to point on the word "cleansing." The supply-pipe $j$ is thereby brought to communicate with the tail-pipe $g$, the upright pipe $d$ with the pipe $k$, and the pipe $k$ with the waste-pipe $m$. The liquid therefore passes up through the tail-pipe, down through the filtering material, and out through the waste-pipe $m$, carrying with it the impurities previously deposited in the filtering material. (See Fig. 6.) After the filtering material has thus been cleansed, the cock $f$ is turned again to its second or "filtered" position, and the liquid, after having been deprived of its impurities, is allowed to pass to the discharge-pipe $l$.

This filter can be connected to hydrants in dwelling-houses, so that the water is filtered before it is allowed to pass to the various distributing-faucets in the house; or our filter may be used with advantage in sugar-houses or other manufactories for filtering liquids of various descriptions.

What we claim as new, and desire to secure by Letters Patent, is—

The combination of stop-cocks $f$ and $n$, constructed as described, with a filtering-vessel, A, and with pipes $j$, $k$, $d$, $g$, $l$, and $m$, substantially in the manner herein set forth.

JOHN GRIFFITH.
F. C. DURANT.

Witnesses:
W. HAUFF,
E. F. KASTENHUBER.